US012760711B2

(12) United States Patent
Yukawa

(10) Patent No.: US 12,760,711 B2
(45) Date of Patent: Oct. 13, 2026

(54) STATE MONITORING APPARATUS FOR MECHANICAL APPARATUS, WIND POWER GENERATION APPARATUS, STATE MONITORING METHOD, AND PROGRAM

(71) Applicant: NSK LTD., Tokyo (JP)

(72) Inventor: Kinji Yukawa, Fujisawa (JP)

(73) Assignee: NSK LTD., Tokyo (JP)

( * ) Notice: Subject to any disclaimer, the term of this patent is extended or adjusted under 35 U.S.C. 154(b) by 488 days.

(21) Appl. No.: 18/282,429

(22) PCT Filed: Jun. 17, 2022

(86) PCT No.: PCT/JP2022/024331
§ 371 (c)(1),
(2) Date: Sep. 15, 2023

(87) PCT Pub. No.: WO2023/282028
PCT Pub. Date: Jan. 12, 2023

(65) Prior Publication Data

US 2024/0141871 A1 May 2, 2024

(30) Foreign Application Priority Data

Jul. 7, 2021 (JP) ................................. 2021-112988
Nov. 19, 2021 (JP) ................................. 2021-188740

(51) Int. Cl.
*F03D 17/00* (2016.01)
*G01M 13/045* (2019.01)

(52) U.S. Cl.
CPC ....... *F03D 17/015* (2023.08); *F03D 17/0065* (2023.08); *F03D 17/032* (2023.08);
(Continued)

(58) Field of Classification Search
CPC . G01M 13/045; F16C 19/527; F16C 2233/00; F16C 2360/31; F03D 80/703;
(Continued)

(56) References Cited

U.S. PATENT DOCUMENTS

| | | | |
|---|---|---|---|
| 4,426,641 | A | 1/1984 | Kurihara et al. |
| 2019/0195192 | A1 | 6/2019 | Takahashi |
| 2021/0293665 | A1 | 9/2021 | Miyazaki |

FOREIGN PATENT DOCUMENTS

| | | | |
|---|---|---|---|
| CN | 106769033 | A | 5/2017 |
| EP | 3 508 834 | A1 | 7/2019 |

(Continued)

OTHER PUBLICATIONS

Nishida Hiroyuki, JP 2011252753 A, "Diagnostic device for bearing", Date published: Dec. 15, 2011 (Year: 2011).*

(Continued)

*Primary Examiner* — John H Le
(74) *Attorney, Agent, or Firm* — Sughrue Mion, PLLC

(57) ABSTRACT

A state monitoring apparatus for a mechanical apparatus including a rolling bearing includes: a first acquisition portion configured to acquire vibration information or sound information of the rolling bearing during rotation; a second acquisition portion configured to acquire a rotation speed of the rolling bearing during rotation; a derivation portion configured to derive, according to the rotation speed, a timing at which data is sampled from the vibration information or the sound information such that the number of times of sampling per rotation of the rolling bearing is a predetermined value; and a generation portion configured to generate, based on the timing derived by the derivation portion, monitoring data by sampling data from the vibration information or the sound information.

13 Claims, 8 Drawing Sheets

(52) U.S. Cl.
CPC ....... *G01M 13/045* (2013.01); *F05B 2260/80* (2013.01); *F05B 2270/334* (2013.01)

(58) Field of Classification Search
CPC .. F03D 17/015; F03D 17/032; F03D 17/0065; G01H 1/003; G01H 3/12; F05B 2270/334; F05B 2260/80
USPC ........................................................... 702/56
See application file for complete search history.

(56) References Cited

FOREIGN PATENT DOCUMENTS

| | | | |
|---|---|---|---|
| JP | 56-138218 | A | 10/1981 |
| JP | 2006-153855 | A | 6/2006 |
| JP | 2011-252753 | A | 12/2011 |
| JP | 2011-252761 | A | 12/2011 |
| WO | 2017/145222 | A1 | 8/2017 |
| WO | 2018/043009 | A1 | 3/2018 |
| WO | 2020/013074 | A1 | 1/2020 |

OTHER PUBLICATIONS

Tsutsui et al. JP 2015031626 A, "Device for monitoring state of rolling bearing", Date published: Feb. 16, 2015 (Year: 2015).*
International Search Report (PCT/ISA/210) issued Aug. 30, 2022 by the International Searching Authority in counterpart International Patent Application No. PCT/JP2022/024331.
Written Opinion (PCT/ISA/237) issued Aug. 30, 2022 by the International Searching Authority in counterpart International Patent Application No. PCT/JP2022/024331.
Extended European Search Report dated Oct. 10, 2024, issued by the European Patent Office in counterpart European Patent Application No. 22837446.8.
Office Action dated May 29, 2026 issued by the State Intellectual Property Office of People's Republic of China in Chinese Patent Application No. 202280022947.5.

* cited by examiner

FIG. 5

| PART OF BEARING | FREQUENCY CORRESPONDING TO PART |
|---|---|
| INNER RING (Si) | $Zfi = \frac{fr}{2}\left(1 + \frac{Da}{dm} \cdot \cos\alpha\right)Z$ |
| OUTER RING (So) | $Zfc = \frac{fr}{2}\left(1 - \frac{Da}{dm} \cdot \cos\alpha\right)Z$ |
| ROLLING BODY (Sb) | $2fb = fr\left(1 - \frac{Da^2}{dm^2} \cdot \cos^2\alpha\right)\frac{dm}{Da}$ |
| RETAINER (Sc) | $fc = \frac{fr}{2}\left(1 - \frac{Da \cdot \cos\alpha}{dm}\right)$ |

fr: ROTATION NUMBER OF INNER RING (OUTER RING) (Hz)
fc: ROTATION SPEED OF RETAINER (Hz)
fb: ROTATION SPEED OF ROLLING BODY (Hz)
dm: PITCH CIRCLE DIAMETER OF ROLLING BODY (mm)
Z: THE NUMBER OF ROLLING BODIES
fi: fr - fc
Da: DIAMETER OF ROLLING BODY (mm)
α: CONTACT ANGLE (rad)

FIG. 6A

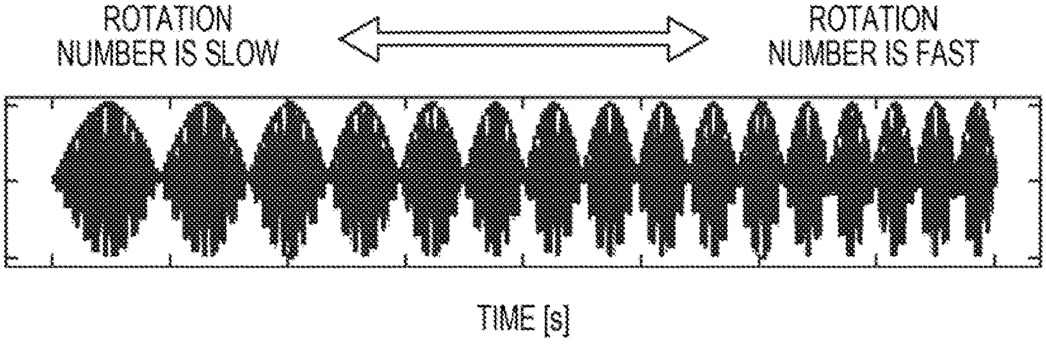

STATE MONITORING APPARATUS FOR MECHANICAL APPARATUS, WIND POWER GENERATION APPARATUS, STATE MONITORING METHOD, AND PROGRAM

CROSS-REFERENCE TO RELATED APPLICATIONS

This application is a National Phase Entry of PCT International Application No. PCT/JP2022/024331 filed on Jun. 17, 2022, which claims priority to Japanese Patent Application No. 2021-112988 filed on Jul. 7, 2021, and Japanese Patent Application No. 2021-188740 filed on Nov. 19, 2021, the contents of all of which are incorporated herein by reference in their entirety.

TECHNICAL FIELD

The present invention relates to a state monitoring apparatus for a mechanical apparatus, a wind power generation apparatus, a state monitoring method, and a program.

BACKGROUND ART

In the related art, a mechanical apparatus such as a wind power generation apparatus includes a rolling bearing. By monitoring a state of the rolling bearing and performing control according to the state, it is possible to suppress malfunctions of the mechanical apparatus and to operate the mechanical apparatus more appropriately. As the information used for monitoring the state of the rolling bearing, vibration, sound, rotation speed, or the like is used.

Patent Literature 1 discloses "rotation-tracking analysis" in which a bearing deterioration diagnosis apparatus analyzes how the magnitude of a vibration noise of an order component of interest changes as a rotation speed increases or decreases. Patent Literature 1 discloses that a database in which the rotation number and a vibration value are associated with each other is defined in advance, and this information is compared with a measured vibration value to determine a state of a bearing.

CITATION LIST

Patent Literature

Patent Literature 1: WO2017-145222A1

SUMMARY OF INVENTION

Technical Problem

For example, in the wind power generation apparatus, an intermittent change in rotation speed may occur due to the influence of wind from the outside. In particular, since the wind power generation apparatus operates at a relatively low speed, the rotation speed, that is, an angular velocity, may change even during one rotation of the rolling bearing. When the rotation speed fluctuates, a vibration frequency of each portion of the rolling bearing fluctuates, and therefore, if data during one rotation of the rolling bearing is used uniformly when the state monitoring is performed, the accuracy will be lowered due to the fluctuation. When the rotation speed of the wind power generation apparatus is relatively low, analysis of a low-frequency component is necessary. At this time, in order to acquire a certain number of data, it is necessary to set a long data sampling time. The longer the sampling time, the higher the possibility that the fluctuation of the rotation speed occurs, and the accuracy is more likely to be affected. As a result, it becomes difficult to appropriately monitor the state of the rolling bearing.

In view of the above problems, an object of the present invention is to accurately monitor a state of a mechanical apparatus even when a rotation speed in a rotation operation of the mechanical apparatus changes in an environment in which the rotation speed may change intermittently.

Solution to Problem

In order to solve the above problems, the present invention has the following configuration. That is, a state monitoring apparatus for a rolling bearing includes:

- a first acquisition portion configured to acquire vibration information or sound information of the rolling bearing during rotation;
- a second acquisition portion configured to acquire a rotation speed of the rolling bearing during rotation;
- a derivation portion configured to derive, according to the rotation speed, a timing at which data is sampled from the vibration information or the sound information such that the number of times of sampling per rotation of the rolling bearing is a predetermined value; and
- a generation portion configured to generate, based on the timing derived by the derivation portion, monitoring data by sampling data from the vibration information or the sound information.

Another aspect of the present invention has the following configuration. That is, a state monitoring apparatus for a mechanical apparatus including a rolling bearing includes:

- an acquisition portion configured to acquire vibration information or sound information of the rolling bearing during rotation at constant time intervals;
- a conversion portion configured to convert the vibration information or the sound information acquired by the acquisition portion into a waveform at a state in which a rotation operation is at a constant angular velocity; and
- a diagnosis portion configured to diagnose a state of the mechanical apparatus using the vibration information or the sound information converted by the conversion portion.

Another aspect of the present invention has the following configuration. That is, a wind power generation apparatus includes:

- a state monitoring apparatus; and a rolling bearing, in which the state monitoring apparatus includes a first acquisition portion configured to acquire vibration information or sound information of the rolling bearing during rotation, a second acquisition portion configured to acquire a rotation speed of the rolling bearing during rotation, a derivation portion configured to derive, according to the rotation speed, a timing at which data is sampled from the vibration information or the sound information such that the number of times of sampling per rotation of the rolling bearing is a predetermined value, and a generation portion configured to generate, based on the timing derived by the derivation portion, monitoring data by sampling data from the vibration information or the sound information.

Another aspect of the present invention has the following configuration. That is, a state monitoring method for a mechanical apparatus including a rolling bearing includes:

- a first acquisition step of acquiring vibration information or sound information of the rolling bearing during rotation;
- a second acquisition step of acquiring a rotation speed of the rolling bearing during rotation;
- a derivation step of deriving, according to the rotation speed, a timing at which data is sampled from the vibration information or the sound information such that the number of times of sampling per rotation of the rolling bearing is a predetermined value; and
- a generation step of generating, based on the timing derived in the derivation step, monitoring data by sampling data from the vibration information or the sound information.

Another aspect of the present invention has the following configuration. That is, a state monitoring method for a mechanical apparatus including a rolling bearing includes:

- an acquisition step of acquiring vibration information or sound information of the rolling bearing during rotation at constant time intervals;
- a conversion step of converting the vibration information or the sound information acquired in the acquisition step into a waveform at a state in which a rotation operation is at a constant angular velocity; and
- a diagnosis step of diagnosing a state of the mechanical apparatus using the vibration information or the sound information converted in the conversion step.

Another aspect of the present invention has the following configuration. That is, a non-transitory computer-readable storage medium storing a computer program is configured to cause a computer to execute:

- a first acquisition step of acquiring vibration information or sound information of a rolling bearing during rotation;
- a second acquisition step of acquiring a rotation speed of the rolling bearing during rotation;
- a derivation step of deriving, according to the rotation speed, a timing at which data is sampled from the vibration information or the sound information such that the number of times of sampling per rotation of the rolling bearing is a predetermined value; and
- a generation step of generating, based on the timing derived in the derivation step, monitoring data by sampling data from the vibration information or the sound information.

Another aspect of the present invention has the following configuration. That is, a non-transitory computer-readable storage medium storing a computer program is configured to cause a computer to execute:

- an acquisition step of acquiring vibration information or sound information of a rolling bearing during rotation at constant time intervals;
- a conversion step of converting the vibration information or the sound information acquired in the acquisition step into a waveform at a state in which a rotation operation is at a constant angular velocity; and
- a diagnosis step of diagnosing a state of a mechanical apparatus including the rolling bearing using the vibration information or the sound information converted in the conversion step.

Advantageous Effects of Invention

According to the present invention, it is possible to accurately monitor a state of a mechanical apparatus even when a rotation speed in a rotation operation of the mechanical apparatus changes in an environment in which the rotation speed may change intermittently.

BRIEF DESCRIPTION OF DRAWINGS

FIG. 5 is a diagram showing an example of a calculation formula of a frequency for each portion of a rolling bearing according to the first embodiment.

FIG. 6A is a diagram for illustrating conversion of vibration data according to a second embodiment.

DESCRIPTION OF EMBODIMENTS

Figure 1:
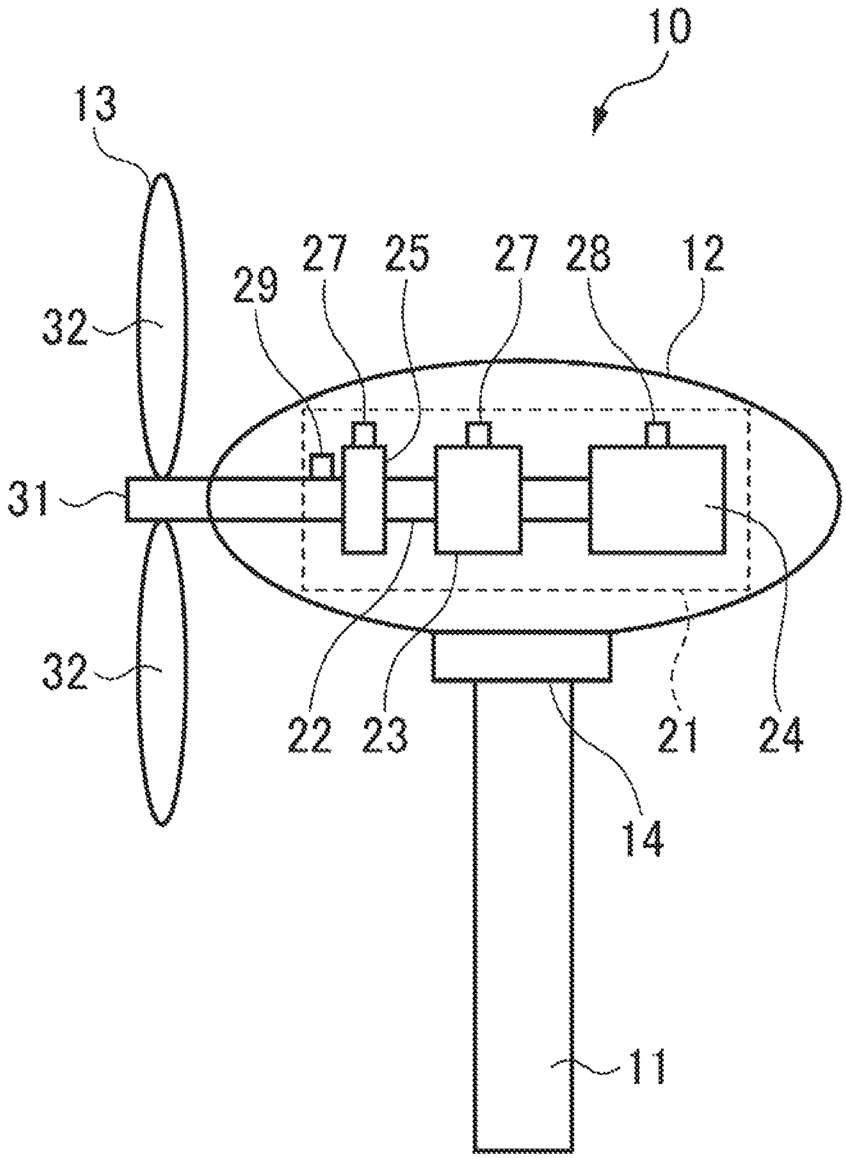
FIG. 1 is a schematic diagram showing an example of an apparatus configuration according to a first embodiment.

Hereinafter, embodiments of the present invention will be described with reference to the drawings. The embodiments described below are embodiments for describing the present invention, and are not intended to limit the present invention. Not all configurations described in the embodiments are essential configurations for solving the problems of the present invention. In the drawings, the same components are denoted by the same reference numerals to show the correspondence.

FIRST EMBODIMENT

Hereinafter, a first embodiment of the present invention will be described.

[Apparatus Configuration]

Hereinafter, an embodiment of an apparatus to which a state monitoring method according to the present invention can be applied will be described. In the following description, a wind power generation apparatus including a rolling bearing will be described as an application example, but the present invention is not limited to the wind power generation apparatus, and can be similarly applied to other mechanical apparatuses. Examples of the apparatus to which the present invention can be applied include apparatuses provided with a rolling bearing and having a relatively low rotation speed and apparatuses with large fluctuation in the rotation number.

FIG. 1 is a schematic configuration diagram of a wind power generation apparatus to which a load estimation method according to the present embodiment is applied. As shown in FIG. 1, a wind power generation apparatus 10 includes a tower 11 erected on the ground, a nacelle 12 supported on an upper end of the tower 11, and a rotor 13 provided at an end portion of the nacelle 12. A rotation mechanism 14 for adjusting an orientation of the nacelle 12 (yaw control) is provided between the tower 11 and the nacelle 12.

A drive train portion 21 is housed in the nacelle 12. The drive train portion 21 includes a main shaft 22, a speed increasing gear 23, a generator 24, and a rolling bearing 25. The main shaft 22 is connected to the generator 24 via the speed increasing gear 23. The main shaft 22 is rotatably supported in the nacelle 12 by the rolling bearing 25. Vibration sensors 27 are provided in the rolling bearing 25 supporting the main shaft 22 and the speed increasing gear 23 to measure the vibration generated in the rolling bearing 25. A rotation speed sensor 29 for detecting a rotation speed of the main shaft 22 is provided. The generator 24 is provided with a power generation amount measuring apparatus 28 that measures a power generation amount.

The rotor 13 includes a hub 31 and a plurality of blades 32. Each of the plurality of blades 32 extends radially from the hub 31. The rotor 13 is provided at an end portion of the main shaft 22 of the drive train portion 21. The hub 31 adjusts an orientation of each of the plurality of blades 32 (pitch control).

In the wind power generation apparatus 10, rotating shafts of the speed increasing gear 23 and the generator 24 are also supported by rolling bearings (not shown) provided separately from the rolling bearings 25. The drive train portion 21 is provided with a brake apparatus (not shown) for stopping or decelerating the rotation of the main shaft 22 as necessary.

In the wind power generation apparatus 10 having the above structure, the main shaft 22 is rotated by the blades 32 of the rotor 13 receiving wind. Thus, the rotation of the main shaft 22 is accelerated by the speed increasing gear 23 and transmitted to the generator 24, which generates electricity. When the blades 32 of the rotor 13 receive wind, a load (radial load and axial load) is applied to the rolling bearing 25 via the main shaft 22. FIG. 1 shows a configuration in which one rolling bearing 25 is provided for one wind power generation apparatus 10 for simplification of description, but the present invention is not limited to this configuration, and a plurality of rolling bearings 25 may be provided for supporting the main shaft 22 in one wind power generation apparatus 10.

[Functional Configuration]

Figure 2:
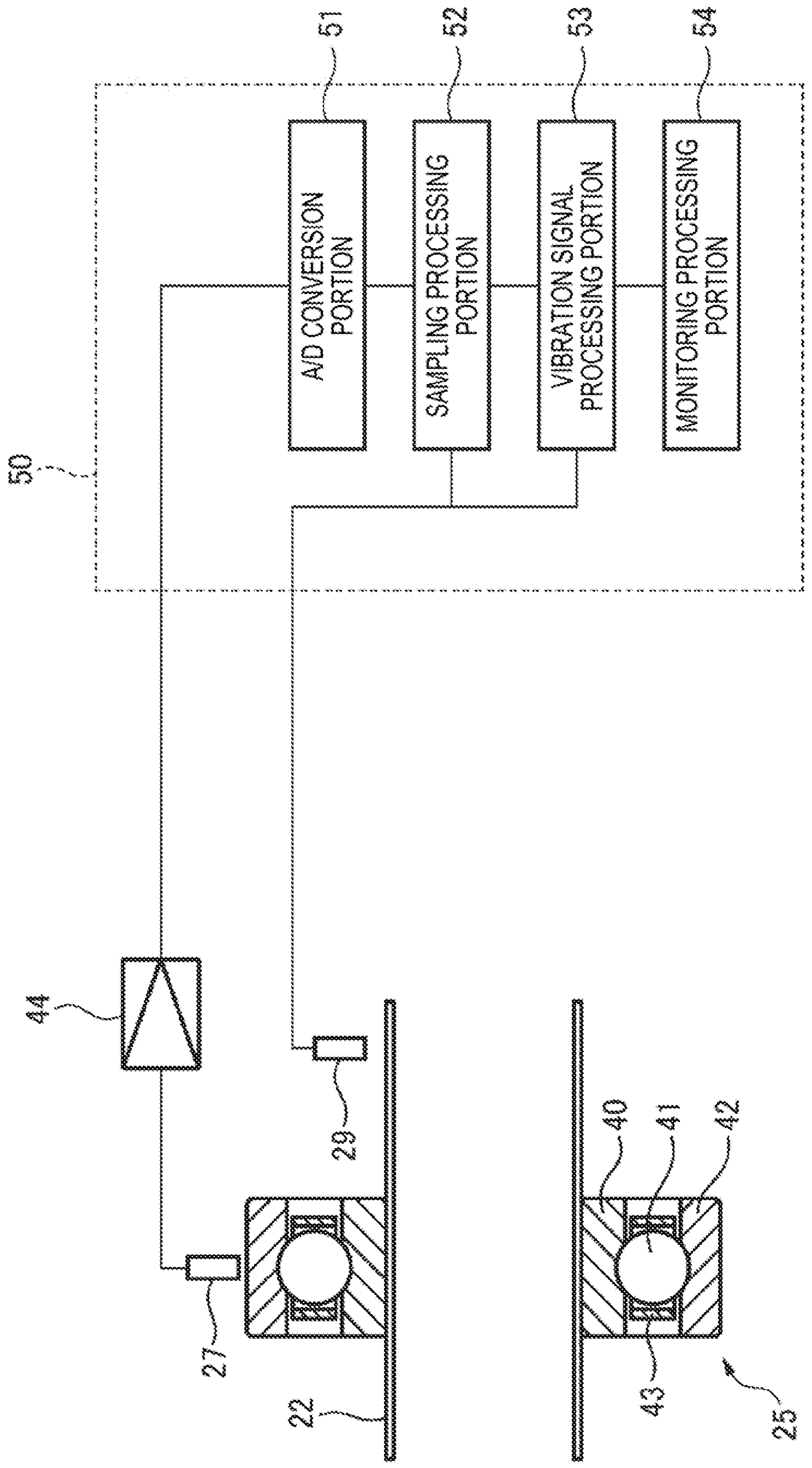
FIG. 2 is a schematic diagram showing an example of a functional configuration according to the first embodiment.

FIG. 2 is a schematic configuration diagram showing an example of a functional configuration according to the present embodiment. FIG. 2 shows configurations of the rolling bearing 25 to be monitored and a monitoring apparatus 50 that performs a monitoring operation according to the present embodiment. The rolling bearing 25 rotatably supports the main shaft 22. In the present embodiment, as the rolling bearing 25, for example, a tapered roller bearing, a cylindrical roller bearing, or the like can be used, but the present invention is not limited thereto.

The monitoring apparatus 50 may be provided in the wind power generation apparatus 10 shown in FIG. 1 or may be provided outside the wind power generation apparatus 10. In FIG. 2, for simplification of description, a configuration in which one monitoring apparatus 50 monitors one rolling bearing 25 is shown. However, the present invention is not limited to this configuration, and one monitoring apparatus 50 may monitor states of a plurality of rolling bearings 25.

The rolling bearing 25 includes an inner ring 40 which is a rotating ring externally fitted to the main shaft 22, an outer ring 42 which is a fixed ring internally fitted to a housing (not shown), a plurality of balls (rollers) which are a plurality of rolling bodies 41 disposed between the inner ring 40 and the outer ring 42, and a retainer 43 that retains the rolling bodies 41 such that the rolling bodies 41 can roll freely. In the rolling bearing 25, friction between the inner ring 40 and the rolling bodies 41 and friction between the outer ring 42 and the rolling bodies 41 are reduced by a predetermined lubrication method. The lubrication method is not particularly limited, and for example, grease lubrication, oil lubrication, or the like is used. The type of a lubricant is also not particularly limited.

The vibration sensor 27 is provided to detect the vibration generated from the rolling bearing 25 during rotation of the main shaft 22. The vibration sensor 27 is fixed to the vicinity of the outer ring 42 of the housing by bolt fixing, adhesion, bolt fixing and adhesion, embedding with a molding material, or the like. In the case of bolt fixing, a rotation suppression function may be provided. The vibration sensor 27 is not limited to being fixedly installed at a detection position, and may be installed at a position for detecting the vibration due to the rolling bearing 25 during state monitoring. Therefore, the vibration sensor 27 may be detachable or movable.

The vibration sensor 27 may be any sensor capable of detecting vibration, and may be any sensor capable of converting detected vibration such as an acceleration, a speed, a strain, a stress, or a displacement to an electric signal, such as an acceleration sensor, an acoustic emission (AE) sensor, an ultrasonic sensor, and a shock pulse sensor. When the vibration sensor 27 is attached to the wind power generation apparatus 10 positioned in an environment where the noise is large, it is more preferable to use an insulation type because it is less affected by noise. Further, when the vibration sensor 27 uses a vibration detection element such as a piezoelectric element, the element may be molded in plastic or the like.

The rolling bearing 25 is provided with the rotation speed sensor 29 that detects a rotation speed of the inner ring 40 externally fitted to the main shaft 22. In the present embodiment, the inner ring 40, which is a rotating ring, and the main shaft 22 have the same rotation speed and the rotation number. The rotation speed of the main shaft 22 may vary depending on an orientation, a volume, and a pressure of the wind received by the wind power generation apparatus 10. Further, the rotation speed can be adjusted by the brake apparatus (not shown). The rotation speed sensor 29 may detect the rotation speed of the rolling bearing 25 by detecting an encoder (not shown) provided on the inner ring 40 of the rolling bearing 25, for example. The wind power generation apparatus 10 and the like according to the present embodiment are rotated at a relatively low rotation speed. Therefore, the rotation speed sensor 29 is capable of detecting a change in the rotation speed during one rotation of the rolling bearing 25. The vibration sensor 27 and the rotation speed sensor 29 may perform the detecting operation only at specified timings (for example, monitoring time periods), or may perform the detecting operation at all times.

An amplifier 44 amplifies an electric signal detected by the vibration sensor 27 and inputs the amplified electric signal to the monitoring apparatus 50. The degree of amplification here is not particularly limited, but is defined in advance. Detection timings of the vibration sensor 27 and the rotation speed sensor 29 correspond to each other, and detection information thereof are processed in association with each other.

The monitoring apparatus 50 may be implemented by, for example, an information processing apparatus including a control apparatus (not shown), a storage apparatus (not shown), and an input/output apparatus (not shown). The control apparatus may include a central processing unit (CPU), a micro processing unit (MPU), a digital single processor (DSP), and a dedicated circuit. The storage apparatus includes volatile and non-volatile storage media such as a hard disk drive (HDD), a read only memory (ROM), and a random access memory (RAM), and can input and output various types of information in response to instructions from the control apparatus. The input/output apparatus notifies an external apparatus or an operator according to instructions from the control apparatus. An output method by the input/output apparatus is not particularly limited, the output method may be, and for example, an auditory notification by voice or a visual notification by screen output. The input/output apparatus may be a network interface having a communication function, and may perform various input/output operations by transmitting data to and receiving data from an external apparatus (not shown) via a network (not shown).

The monitoring apparatus 50 includes an A/D conversion portion 51, a sampling processing portion 52, a vibration signal processing portion 53, and a monitoring processing portion 54. Each portion may be implemented by reading out a corresponding program from the storage apparatus and executing the program by the control apparatus described above. Further, various functions may be implemented by the control apparatus controlling the input/output apparatus.

The A/D conversion portion 51 acquires the electric signal detected by the vibration sensor 27 as vibration information via the amplifier 44, and performs analog/digital (A/D) conversion according to the content of the electric signal.

The sampling processing portion 52 samples data used for processing of the vibration signal processing portion 53 and the monitoring processing portion 54 in the latter stage from a vibration signal processed by the A/D conversion portion 51, based on the rotation speed detected by the rotation speed sensor 29. A sampling method here will be described later. The sampled data is output to the vibration signal processing portion 53.

The vibration signal processing portion 53 performs signal analysis processing using the data sampled by the sampling processing portion 52. In the signal analysis processing, fast Fourier transform (FFT) analysis is performed, and then an order ratio analysis is performed. The signal analysis processing may be performed by performing envelope processing, or filter processing using a low-pass filter, a band-pass filter, or the like. The monitoring processing portion 54 diagnoses the state of the rolling bearing 25 using the data processed by the vibration signal processing portion 53, and outputs a diagnosis result. For example, a part of the data processed by the vibration signal processing portion 53 may be extracted, and the state may be diagnosed using the data. Diagnosis items of the state monitoring performed by the monitoring processing portion 54 are not particularly limited, and for example, arbitrary diagnosis items such as abnormal contact, poor lubrication, damage or deterioration of the portions constituting the rolling bearing 25 may be targets.

A monitoring result of the monitoring processing portion 54 may be notified to the outside via the network (not shown), or may control an operation of the wind power generation apparatus 10. As the control of the operation of the wind power generation apparatus 10 here, for example, the rotation mechanism 14 may be controlled to adjust the orientation of the nacelle 12 (yaw control), or the hub 31 may be controlled to adjust the orientation of each of the plurality of blades 32 (pitch control). The rotation speed of the main shaft 22 may be controlled to a predetermined speed by a brake mechanism (not shown).

[Sampling Processing]

In the present embodiment, the rotation speed of the rolling bearing 25 may intermittently fluctuate due to external factors such as wind. When the rotation speed fluctuates, a vibration frequency of each portion of the rolling bearing 25 fluctuates, and a frequency serving as a determination reference is not determined, which affects the accuracy of subsequent monitoring operation and diagnostic operation. In a wind power generation apparatus or the like, since the rotation speed is relatively low, it is highly possible that the rotation speed fluctuates during one rotation.

Figure 3:
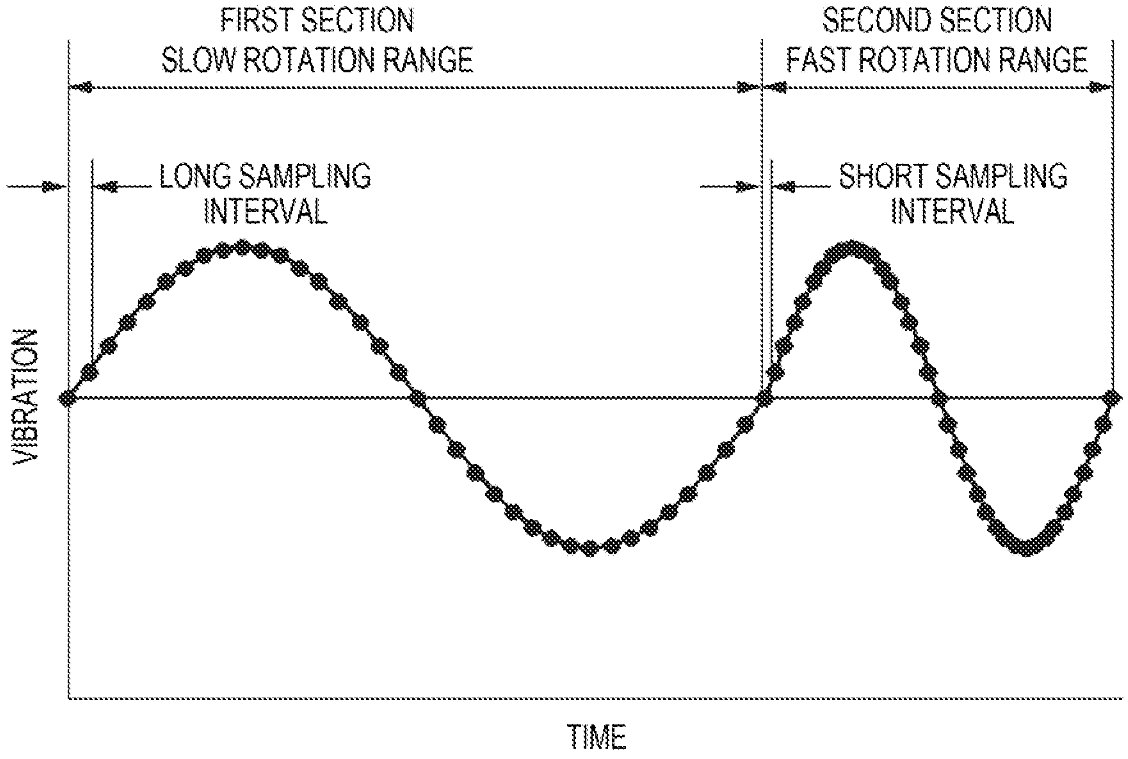
FIG. 3 is a schematic diagram for illustrating sampling according to the present invention.

FIG. 3 is a schematic diagram for illustrating data sampling according to the present embodiment. In FIG. 3, the vertical axis represents vibration, and the horizontal axis represents time. The vibration corresponds to a value of the electric signal converted by the A/D conversion portion 51.

In FIG. 3, two sections are taken as an example. A first section shows an example in which the rotation speed of the rolling bearing 25 is relatively slower than that in a second section. That is, the rotation speed of the rolling bearing 25 fluctuates. As shown in FIG. 3, sampling timings are different between the first section and the second section. This changes a sampling period according to the rotation speed such that the number of times of sampling per rotation (the number of data) is the same. Circles shown in the graph of FIG. 3 indicate positions of the data to be sampled.

In the example of FIG. 3, the rotation speed changes after one rotation in the first section, and one rotation in the second section is performed. Actually, since the rotation speed may fluctuate during one rotation, the sampling timing may fluctuate during one rotation.

[Processing Flow]

Figure 4:
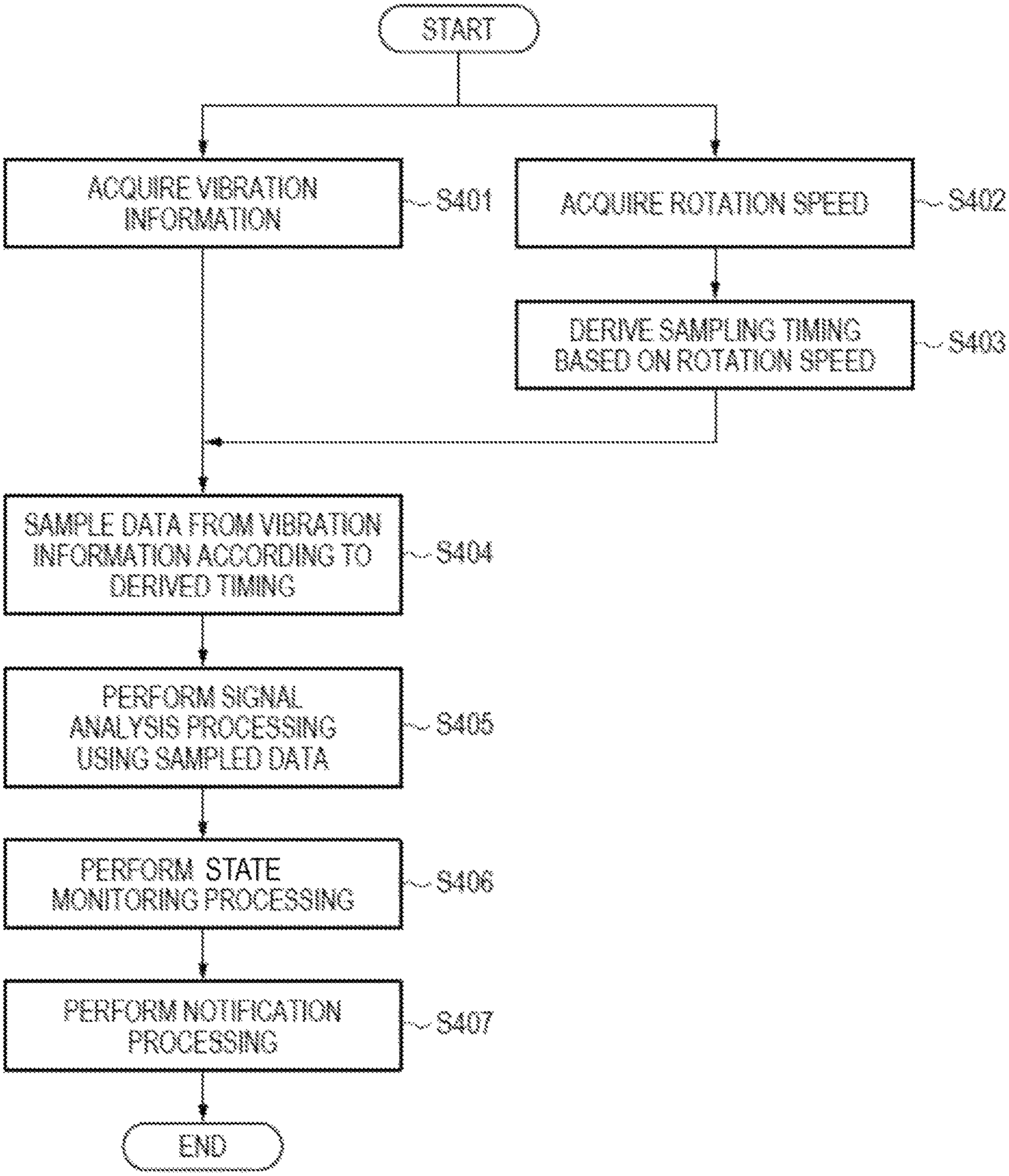
FIG. 4 is a flowchart of state monitoring processing according to the first embodiment.

FIG. 4 is a flowchart of sampling processing according to the present embodiment. This processing is executed by the monitoring apparatus 50, and may be implemented by, for example, reading out the programs for implementing the portions shown in FIG. 1 from the storage apparatus and executing the programs by the control apparatus (not shown) included in the monitoring apparatus 50.

In S401, the monitoring apparatus 50 acquires the vibration information detected by the vibration sensor 27. In this way, a portion that acquires the vibration information (or sound information) of the rolling bearing 25 during rotation is referred to as a first acquisition portion. A step of acquiring the vibration information (or sound information) of the rolling bearing 25 during rotation is referred to as a first acquisition step.

In S402, the monitoring apparatus 50 acquires the rotation speed detected by the rotation speed sensor 29. In this way, a portion that acquires the rotation speed of the rolling bearing 25 during rotation is referred to as second acquisition portion. A step of acquiring the rotation speed of the rolling bearing 25 during rotation is referred to as a second acquisition step. Detection timings of the vibration information acquired in S401 and the rotation speed acquired in S402 are associated with each other.

In S403, the monitoring apparatus 50 derives a sampling timing based on the rotation speed acquired using the rotation speed sensor 29 in the process of S402 of FIG. 4. As described above, the number of times of sampling per rotation of the rolling bearing 25 is defined, and the timing of sampling data varies according to the rotation speed. Here, the sampling timing is derived. More specifically, the sampling timing is derived using a sampling clock synchronized with the rotation speed such that the number of times of sampling per rotation is constant. A derivation method may be derivation using a predetermined calculation formula or may be derivation using a table or the like in which the rotation speed and the sampling timing (time interval or the like) are associated with each other. In this way, a portion that derives the timing of sampling data from the vibration information or the sound information according to the rotation speed such that the number of times of sampling per rotation of the rolling bearing 25 is a predetermined value is referred to as a derivation portion. A step of deriving the timing of sampling data from the vibration information or the sound information according to the rotation speed such that the number of times of sampling per rotation of the rolling bearing 25 is a predetermined value is referred to as a derivation step.

In S404, the monitoring apparatus 50 samples, according to the timing derived in S403, data from the vibration information acquired by amplifying the electric signal detected by the vibration sensor 27 in S401 by the amplifier 44 and inputting the amplified electric signal to the monitoring apparatus 50. In this way, a portion that generates, based on the timing derived by the derivation portion, monitoring data by sampling data from the vibration information (or sound information) is referred to as a generation portion. A step of generating, based on the timing derived in the derivation step, monitoring data by sampling data from the vibration information (or sound information) is referred to as a generation step.

In S405, the monitoring apparatus 50 performs signal analysis processing on the data sampled in S404. In the analysis processing here, for example, the order ratio analysis may be performed after the vibration information is subjected to fast Fourier transform (FFT) analysis. The sampled data may be subjected to envelope analysis processing or filter processing, and the content thereof may be changed according to monitoring processing in the latter stage.

In S406, the monitoring apparatus 50 monitors the state of the rolling bearing 25 using a result of the analysis processing in S405. Monitoring items here are not particularly limited, and for example, arbitrary diagnosis items such as abnormal contact, poor lubrication, damage or deterioration of the portions constituting the rolling bearing 25 may be targets. With respect to the monitoring items, for example, the frequency for each portion of the rolling bearing 25 may be calculated using a relational expression shown in FIG. 5. When the data at the frequency exceeds a predetermined threshold, it may be determined that an abnormality occurs, or when the data at the frequency is equal to or less than the predetermined threshold, it may be determined that no abnormality occurs.

In S407, the monitoring apparatus 50 performs notification processing based on a result of the state monitoring processing in S406. Here, the notification may be performed when it is determined that an abnormality occurs, or the notification may be performed when it is determined that no abnormality occurs. A notification method is not particularly limited, and the notification method may be switched according to the presence or absence of an abnormality. Then, this processing flow ends.

As described above, according to the present embodiment, it is possible to accurately monitor a state of a mechanical apparatus even when a rotation speed in a rotation operation of the mechanical apparatus changes in an environment in which the rotation speed may change intermittently. Since a rotation speed of a rolling bearing is relatively slow, even if the data acquisition time becomes long, it is possible to appropriately extract monitoring data by reducing the influence of the fluctuation of the rotation speed during the data acquisition time.

SECOND EMBODIMENT

A second embodiment of the present invention will be described. The description of the same configuration as that of the first embodiment will be omitted, and the description will be given focusing on the difference. Apparatuses and functional configurations are the same as those described in the first embodiment with reference to FIGS. 1 and 2.

[Conversion of Vibration Data]

Figure 6B:
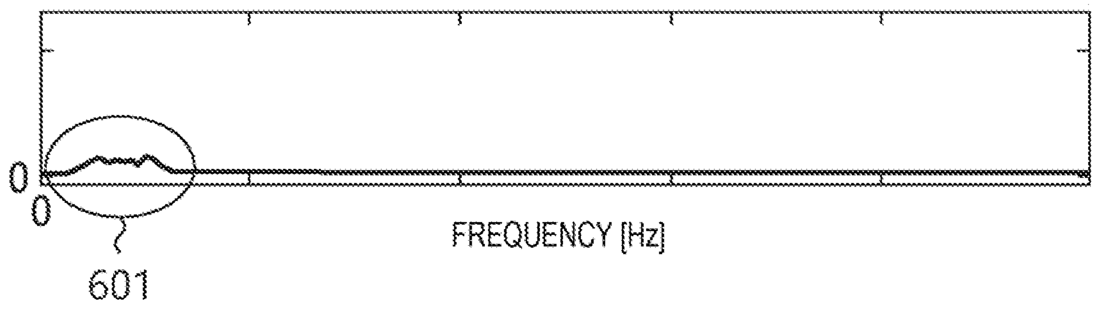
FIG. 6B is a diagram for illustrating the conversion of the vibration data according to the second embodiment.

First, conversion of vibration data according to the present embodiment will be described. FIGS. 6A to 6D are diagrams for illustrating the conversion of the vibration data according to the present embodiment. FIG. 6A shows an example of vibration data A obtained from a measurement target via a vibration sensor or the like. In FIG. 6A, the horizontal axis represents time [s], and the vertical axis represents amplitude. Actual vibration data of a bearing is data in which different vibrations with many different frequencies are superimposed, but the vibration data A here will be described using an example in which only two pieces of vibration data B and C are included. In the example shown in FIG. 6A, an angular velocity of a rolling bearing increases over time, and the rotation number increases in proportion to the angular velocity. As a result, a frequency of the vibration data C of the two pieces of vibration data B and C gradually increases over time, and a waveform of the entire vibration data A shown in FIG. 6A also changes. In FIG. 6A, an envelope shown on an upper side of the vibration data corresponds to a waveform indicating a result of envelope processing. The rotation number is not limited to the fluctuation as shown in FIG. 6A, and may change to decrease over time, or may increase or decrease within a certain period of time.

FIG. 6B shows a result obtained by applying the envelope processing and fast Fourier transform (FFT) processing to the waveform shown in FIG. 6A. In FIG. 6B, the horizontal axis represents frequency [Hz], and the vertical axis represents intensity. At this time, a frequency peak cannot be detected as shown in a region 601 of FIG. 6B due to the fluctuation of the rotation number in the vibration data C. Therefore, it is impossible to specify frequency characteristics of the vibration data C, and analysis based on the frequency characteristics becomes difficult.

As described above, for example, a rolling bearing for a wind power generation apparatus uses frequency analysis for state monitoring or the like. The natural frequency of vibration of the rolling bearing is proportional to the angular velocity during rotation, and in the frequency analysis, it is necessary to use data at a state in which the rolling bearing rotates at a constant speed. Therefore, in methods in the related art, when data used for diagnosis is detected, sampling is performed at constant time intervals on the assumption that the rotation number is stable. However, in the case where the angular velocity fluctuates during one rotation of the rolling bearing and a frequency of vibration changes, the accuracy of the state monitoring decreases in the above method.

Therefore, in the present embodiment, vibration data sampled at equal time intervals in a state in which the angular velocity fluctuates is converted into vibration data corresponding to a state in which the angular velocity is constant, that is, the rotation is performed at a uniform velocity.

Figure 6C:
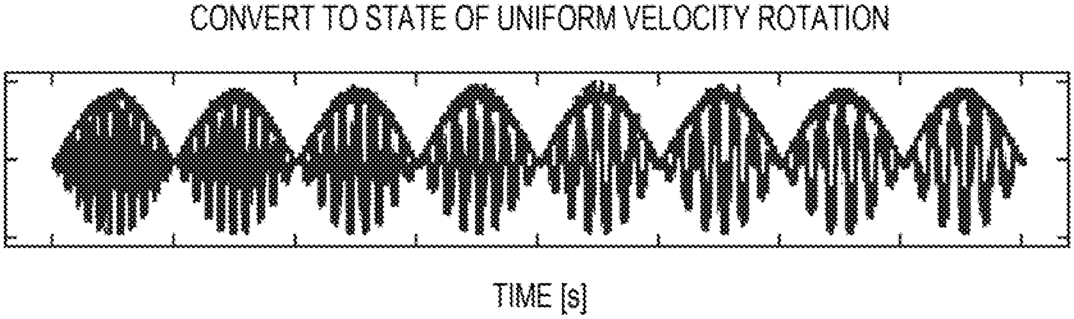
FIG. 6C is a diagram for illustrating the conversion of the vibration data according to the second embodiment.

FIG. 6C shows an example of vibration data D obtained by applying processing of removing the influence of the fluctuation of the rotation number according to the present embodiment to the vibration data A shown in FIG. 6A. In FIG. 6C, the horizontal axis represents time [s], and the vertical axis represents amplitude. In FIG. 6C, the vibration data A in FIG. 6A is converted into vibration data corresponding to a state in which the angular velocity is constant, that is, the rotation is performed at a uniform velocity.

In the conversion method according to the present embodiment, first, $t_b$ satisfying the following formula (1) is obtained using the original vibration data and a predetermined angular velocity. That is, according to the following formula (1), a time $t_b$ in the case of rotation at $\omega_{(t)}$ which is equal to a rotation angle of a time $t_0$ in the case of rotation at Wo is obtained. The predetermined angular velocity here is described as an initial angular velocity wo in the vibration data, but is not limited thereto. For example, the predetermined angular velocity may be an average value or a maximum value of angular velocities within a predetermined range of the vibration data. Alternatively, the predetermined angular velocity may be an angular velocity at a predetermined timing of the vibration data. $t_0$ may be 0. When to =0, to on the left side of the following formula (1) is equivalent to being omitted.

[Formula 1]

$$\omega_0 \times (t_a - t_0) = \int_{t_0}^{t_b} \omega_{(t)} dt \tag{1}$$

$\omega_0$: initial angular velocity $\omega_{(t)}$: angular velocity at time t $t_0$: time (first time in the vibration data to be processed)

$t_a$, $t_b$: time ($t_0<t_b<t_a$)

Further, the vibration data A before conversion and the vibration data D after conversion are converted according to the following formula (2).

$$D(t_a) = A(t_b) \tag{2}$$

A(t): vibration data before conversion at time t

D(t): vibration data after conversion at time t

By the conversion using the above formulas (1) and (2), the vibration data D shown in FIG. 6C is obtained. That is, the vibration data D corresponds to waveform data at a state in which the angular velocity (here, the initial angular velocity wo) is constant. In FIG. 6C, an envelope shown on an upper side of the vibration data D corresponds to a waveform indicating the result of the envelope processing.

Figure 6D:
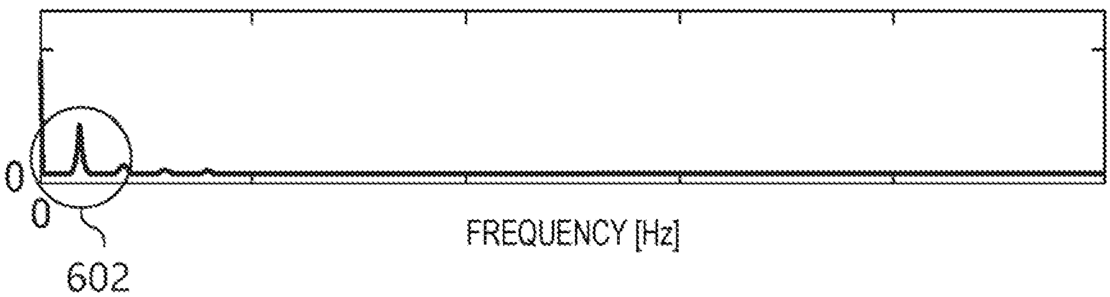
FIG. 6D is a diagram for illustrating the conversion of the vibration data according to the second embodiment.

FIG. 6D shows a result of applying the envelope processing and FFT processing to the waveform shown in FIG. 6C. In FIG. 6D, the horizontal axis represents frequency [Hz], and the vertical axis represents intensity. At this time, because of a waveform in which the rotation number is assumed to be constant, a frequency peak can be detected as shown in a region 602 of FIG. 6D, and analysis based on frequency characteristics can be performed.

In the above flow, an example is shown in which the data conversion processing, the envelope processing, and the FFT processing are performed on the vibration data in this order, but the present invention is not limited thereto. For example, the envelope processing, the data conversion processing, and the FFT processing may be performed in this order. Alternatively, only the data conversion processing and the FFT processing may be performed without performing the envelope processing.

Since the number of times of sampling for acquiring the vibration data A is limited, vibration data $A(t_b)$ corresponding to the time $t_b$ specified by the above formula (1) may not exist in the vibration data A obtained by the vibration sensor or the like. In such a case, a predetermined range a may be set in advance, and the vibration data D may be obtained using vibration data $A(t_b')$ corresponding to $t_b'$ included in the predetermined range with $t_b$ as a reference, as in the following formula (3).

$$D(t_a) = A(t_b')(t_b - a < t_b' < t_b + a) \tag{3}$$

Alternatively, an interpolation formula based on vibration data A(t) corresponding to t (for convenience, $t_b-1$, $t_b+1$) before and after $t_b$ may be defined, such as the following formula (4), and the vibration data D may be obtained.

$$D(t_a) = \{A(t_b - 1) + A(t_b + 1)\}/2 \tag{4}$$

As a data interpolation method for data conversion, a method other than the above methods may be used, and the interpolation method to be applied may be switched according to the purpose.

In the present embodiment, the sampling processing portion 52 of the monitoring apparatus 50 performs conversion processing on data used for processing of the vibration signal processing portion 53 and the monitoring processing portion 54 in the latter stage from a vibration signal processed by the A/D conversion portion 51, based on a rotation speed detected by the rotation speed sensor 29. The conversion processing here is performed by the methods described with reference to FIGS. 6A to 6D. The converted data is output to the vibration signal processing portion 53.

[Data Conversion Processing]

Hereinafter, data conversion processing will be described, using the wind power generation apparatus 10 to which a state monitoring method according to the present embodiment can be applied as an example.

Figure 7A:
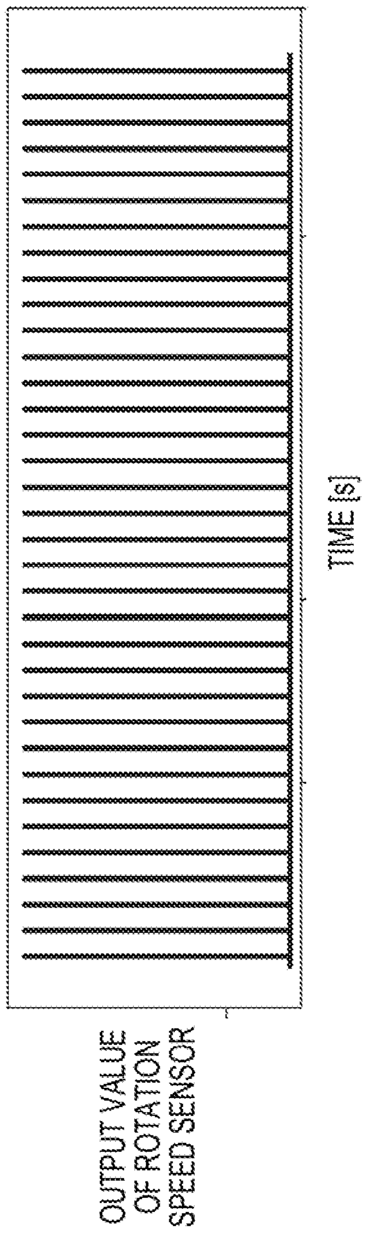
FIG. 7A is a diagram for illustrating an example of waveform detection according to the present invention.
Figure 7B:
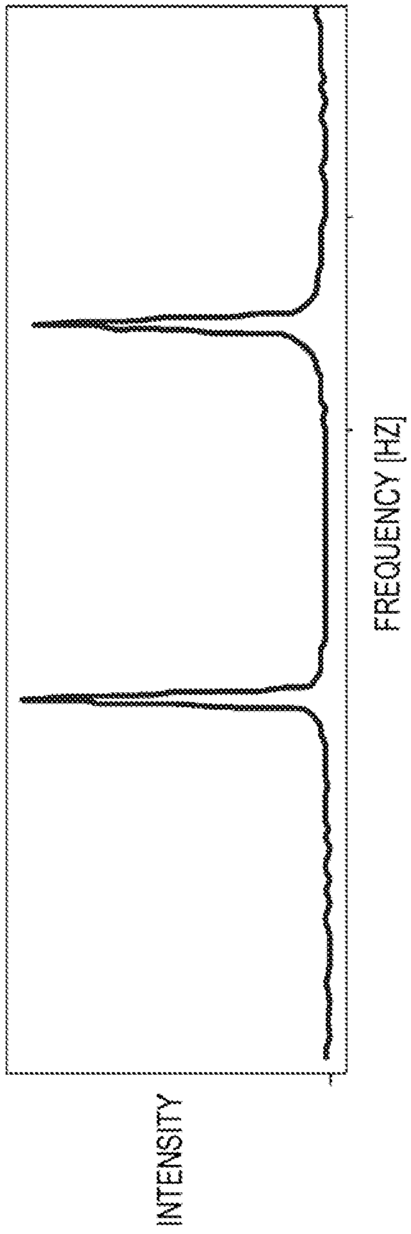
FIG. 7B is a diagram for illustrating an example of the waveform detection according to the present invention.

FIGS. 7A and 7B show an example of rotation speed information of the rolling bearing 25 included in the wind power generation apparatus 10 obtained by the rotation speed sensor 29. In FIG. 7A, the horizontal axis represents time [s], and the vertical axis represents an output value of the rotation speed sensor 29. For example, when the rotation speed sensor 29 detects a predetermined marker (not shown) provided on the rolling bearing 25, a peak value as shown in FIG. 7A is output. The configuration of the marker is not particularly limited, and for example, the marker may be detected once every time the rolling bearing 25 makes one rotation.

FIG. 7B shows an example in which the frequency is derived by performing the FFT processing on a signal shown in FIG. 7A. In FIG. 7B, the horizontal axis represents frequency [Hz], and the vertical axis represents intensity. The angular velocity can be derived based on a detection timing of the peak value indicated by the signal shown in FIG. 7B.

In the above flow, an example is shown in which conversion processing of the rotation number, the envelope processing, and the FFT processing are performed in this order on the vibration data, but the present invention is not limited thereto. For example, the envelope processing, the conversion processing of the rotation number, and the FFT processing may be performed in this order.

[Processing Flow]

Figure 8:
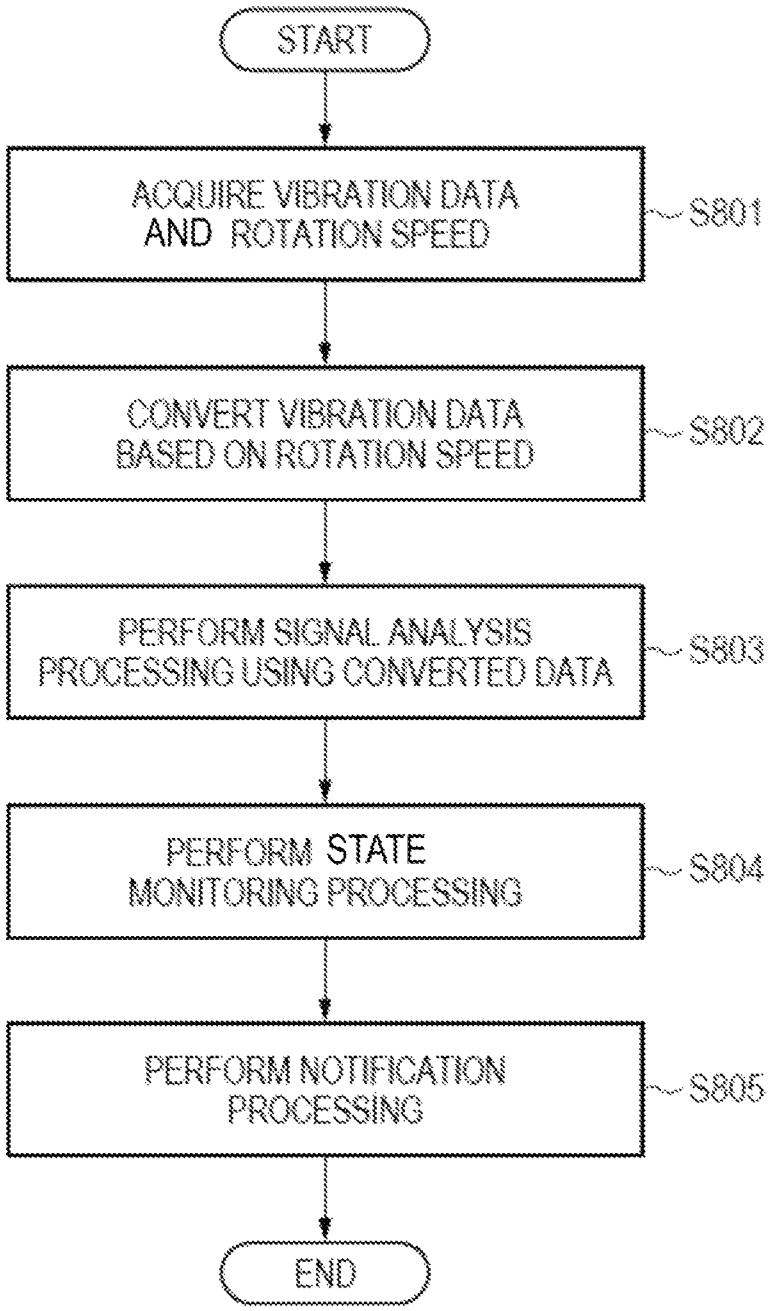
FIG. 8 is a flowchart of state monitoring processing according to the second embodiment.

FIG. 8 is a flowchart of sampling processing according to the present embodiment. This processing is executed by the monitoring apparatus 50, and may be implemented by, for example, reading out programs for implementing portions shown in FIG. 3 from a storage apparatus (not shown) and executing the programs by a control apparatus (not shown) included in the monitoring apparatus 50.

In S801, the monitoring apparatus 50 acquires the vibration data detected by the vibration sensor 27 and the rotation speed detected by the rotation speed sensor 29. The vibration data and the rotation speed acquired here are associated with the detection timing.

In S802, the monitoring apparatus 50 converts the vibration data acquired in S801 based on the rotation speed acquired in S801. Here, it is assumed that the angular velocity of the rolling bearing 25 fluctuates, and the vibration data is converted using the above formulas (1) and (2) assuming that the rolling bearing 25 rotates at a constant angular velocity. As described with reference to FIGS. 7A and 7B, the monitoring apparatus 50 can derive the angular velocity of the rolling bearing 25 from the rotation speed, and can use the angular velocity for the data conversion processing.

In S803, the monitoring apparatus 50 performs signal analysis processing on the data converted in S802. In the analysis processing here, for example, an order ratio analysis may be performed after vibration information is subjected to FFT analysis. As described above, the sampled data may be subjected to envelope analysis processing or filter processing, and the content thereof may be changed according to monitoring processing in the latter stage.

In S804, the monitoring apparatus 50 monitors a state of the rolling bearing 25 using a result of the analysis processing in S803. Monitoring items here are not particularly limited, and for example, arbitrary diagnosis items such as rotation slip and revolution slip of the rolling bearing 25, or abnormal contact, poor lubrication, damage or deterioration of portions constituting the rolling bearing 25 may be targets. With respect to the monitoring items, for example, a frequency of each of the portions of the rolling bearing 25 may be calculated using the relational expression shown in FIG. 5, and the presence or absence of rotation slip and revolution slip may be determined based on a difference between the frequency and a peak frequency considered to be generated by the portion, or the presence or absence of abnormality may be determined by comparing the peak value of the analysis result with a predetermined threshold.

In S805, the monitoring apparatus 50 performs notification processing based on a result of the state monitoring processing in S804. Here, the notification may be performed when it is determined that an abnormality occurs, or the notification may be performed when it is determined that no abnormality occurs. A notification method is not particularly limited, and the notification method may be switched according to the presence or absence of an abnormality. Then, this processing flow ends.

As described above, according to the present embodiment, it is possible to accurately monitor a state of a mechanical apparatus even when a rotation speed in a rotation operation of the mechanical apparatus changes in an environment in which the rotation speed may change intermittently.

OTHER EMBODIMENTS

In the above embodiments, the vibration sensor 27 is used to detect the vibration of the rolling bearing 25, but the present invention is not limited thereto. A sound sensor including a microphone may be used instead of the vibration sensor 27 to detect sound information. In this case, the above data sampling processing is performed on the sound information.

In the present invention, programs or applications for implementing the functions of the one or more embodiments described above may be supplied to a system or an apparatus using a network or a storage medium, and the functions can also be implemented in the processing in which one or more processors in a computer of the system or the apparatus read and execute the programs.

The functions may also be implemented by a circuit (for example, an application specific integrated circuit (ASIC) or a field programmable gate array (FPGA)) that implements one or more functions.

As described above, the present invention is not limited to the above embodiments. Combining the configurations of the embodiments with each other and modifications and applications by a person skilled in the art based on the description and well-known techniques are also intended by the present invention and fall within the scope of protection.

(2) The state monitoring apparatus according to (1), in which the generation portion is configured to generate the monitoring data by performing an order ratio analysis on the data sampled from the vibration information or the sound information.

According to this configuration, by performing the order ratio analysis using the data sampled according to the rotation speed, it is possible to generate monitoring data for monitoring with higher accuracy.

(3) The state monitoring apparatus according to (2), in which the generation portion is further configured to perform envelope analysis processing or filter processing on the monitoring data.

According to this configuration, data to which the envelope analysis processing and the filter processing are applied can be generated as the monitoring data.

(4) The state monitoring apparatus according to (2) or (3), further including a diagnosis portion configured to diagnose a state of the rolling bearing using the monitoring data generated by the generation portion.

According to this configuration, it is possible to perform a state diagnosis with higher accuracy using the data sampled according to the rotation speed.

(5) A state monitoring apparatus for a mechanical apparatus including a rolling bearing, the state monitoring apparatus including:

an acquisition portion configured to acquire vibration information or sound information of the rolling bearing during rotation at constant time intervals;

a conversion portion configured to convert the vibration information or the sound information acquired by the acquisition portion into a waveform at a state in which a rotation operation is at a constant angular velocity; and a diagnosis portion configured to diagnose a state of the mechanical apparatus using the vibration information or the sound information converted by the conversion portion.

According to this configuration, it is possible to accurately monitor a state of the mechanical apparatus even when a rotation speed in a rotation operation of the mechanical apparatus changes in an environment in which the rotation speed may change intermittently.

(6) The state monitoring apparatus according to (5), in which the conversion portion is configured to convert, as the constant angular velocity, an angular velocity at a predetermined timing when the acquisition portion acquires the vibration information or the sound information.

According to this configuration, for example, the vibration data can be converted into a waveform of a constant angular velocity with reference to an initial angular velocity or the like of the vibration data, and the state monitoring can be performed with high accuracy.

(7) The conversion portion is configured to perform conversion using the following formula.

[Formula 2]

$$\omega_0 \times (t_a - t_0) = \int_{t_0}^{t_b} \omega_{(t)} dt$$

$$D(t_a) = A(t_b)$$

$\omega_0$: initial angular velocity $\omega_{(t)}$: angular velocity at time t $t_0$: time (first time in the vibration data to be processed)

$t_a$, $t_b$: time ($t_0<t_b<t_a$)

A(t): vibration data before conversion at time t

D(t): vibration data after conversion at time t

The state monitoring apparatus according to (5) or (6), in which the conversion portion is configured to perform conversion using the above formula.

(8) The state monitoring apparatus according to any one of (5) to (7), further including: a derivation portion configured to derive, based on rotation number during rotation of the rolling bearing, an angular velocity during the rotation, in which the conversion portion is configured to convert, based on the angular velocity derived by the derivation portion, the vibration information or the sound information acquired by the acquisition portion.

According to this configuration, it is possible to appropriately derive the angular velocity in the rotation operation of the mechanical apparatus and use the angular velocity for data conversion.

(9) The state monitoring apparatus according to any one of (5) to (8), in which the conversion portion is configured to perform conversion using the information acquired by the acquisition portion or information obtained by applying envelope processing to the information acquired by the acquisition portion.

According to this configuration, data conversion processing can be applied to either raw data or data subjected to the envelope processing as the vibration data to be subjected to the data conversion processing, and it is possible to use different vibration data when performing the data conversion depending on the purpose.

(10) A wind power generation apparatus including: the state monitoring apparatus according to any one of (1) to (9); and a rolling bearing.

According to this configuration, in a case where the rotation speed changes intermittently in the wind power generation apparatus, the state of the mechanical apparatus can be monitored with high accuracy even when the rotation speed changes.

(11) A state monitoring method for a rolling bearing, the state monitoring method including:

a first acquisition step of acquiring vibration information or sound information of the rolling bearing during rotation;

a second acquisition step of acquiring a rotation speed of the rolling bearing during rotation;

a derivation step of deriving, according to the rotation speed, a timing at which data is sampled from the vibration information or the sound information such that the number of times of sampling per rotation of the rolling bearing is a predetermined value; and a generation step of generating, based on the timing derived in the derivation step, monitoring data by sampling data from the vibration information or the sound information.

According to this configuration, it is possible to accurately monitor a state of the mechanical apparatus even when a rotation speed in a rotation operation of the mechanical apparatus changes in an environment in which the rotation speed may change intermittently.

(12) A state monitoring method for a mechanical apparatus including a rolling bearing, the state monitoring method including:

an acquisition step of acquiring vibration information or sound information of the rolling bearing during rotation at constant time intervals;

a conversion step of converting the vibration information or the sound information acquired in the acquisition step into a waveform at a state in which a rotation operation is at a constant angular velocity; and a diagnosis step of diagnosing a state of the mechanical apparatus using the vibration information or the sound information converted in the conversion step.

According to this configuration, it is possible to accurately monitor a state of the mechanical apparatus even when a rotation speed in a rotation operation of the mechanical apparatus changes in an environment in which the rotation speed may change intermittently.

(13) A non-transitory computer-readable storage medium storing a computer program configured to cause a computer to execute:

a first acquisition step of acquiring vibration information or sound information of a rolling bearing during rotation;

a second acquisition step of acquiring a rotation speed of the rolling bearing during rotation;

a derivation step of deriving, according to the rotation speed, a timing at which data is sampled from the vibration information or the sound information such that the number of times of sampling per rotation of the rolling bearing is a predetermined value; and a generation step of generating, based on the timing derived in the derivation step, monitoring data by sampling data from the vibration information or the sound information.

According to this configuration, it is possible to accurately monitor a state of the mechanical apparatus even when a rotation speed in a rotation operation of the mechanical apparatus changes in an environment in which the rotation speed may change intermittently.

(14) A non-transitory computer-readable storage medium storing a computer program configured to cause a computer to execute:

an acquisition step of acquiring vibration information or sound information of a rolling bearing during rotation at constant time intervals;

a conversion step of converting the vibration information or the sound information acquired in the acquisition step into a waveform at a state in which a rotation operation is at a constant angular velocity; and a diagnosis step of diagnosing a state of a mechanical apparatus including the rolling bearing using the vibration information or the sound information converted in the conversion step.

According to this configuration, it is possible to accurately monitor a state of the mechanical apparatus even when a rotation speed in a rotation operation of the mechanical apparatus changes in an environment in which the rotation speed may change intermittently.

Although various embodiments have been described above with reference to the drawings, it is needless to say that the present invention is not limited to such examples. It is apparent for those skilled in the art to which the present invention belongs that various modified examples or corrected examples are conceivable within the scope recited in the claims, and it is understood that the above falls within the technical scope of the present invention. In addition, within the scope not departing from the gist of the invention, each of the configuration elements in the above embodiments may be combined in any manner.

The present application is based on a Japanese Patent Application (No. 2021-112988) filed on Jul. 7, 2021 and a Japanese Patent Application (No. 2021-188740) filed on Nov. 19, 2021, the contents of which are incorporated herein by reference.

REFERENCE SIGNS LIST

10 wind power generation apparatus
11 tower
12 nacelle
13 rotor
14 rotation mechanism
21 drive train portion
22 main shaft
23 speed increasing gear
24 generator
25 rolling bearing
27 vibration sensor
28 power generation amount measuring apparatus
29 rotation speed sensor
31 hub
32 blade
40 inner ring
41 rolling body
42 outer ring
43 retainer
44 amplifier
50 monitoring apparatus
51 A/D conversion portion
52 sampling processing portion
53 vibration signal processing portion
54 monitoring processing portion

The invention claimed is:

1. A state monitoring apparatus for a mechanical apparatus including a rolling bearing, the state monitoring apparatus comprising:

a first acquisition portion configured to acquire vibration information or sound information of the rolling bearing during rotation via a vibration sensor configured to detect a vibration or a sound of the rolling bearing and an amplifier configured to amplify an electric signal from the vibration sensor as the vibration information or the sound information;

a second acquisition portion configured to acquire a rotation speed of the rolling bearing during rotation via a rotation speed sensor;

a derivation portion configured to derive, according to the rotation speed, a timing at which data is sampled from the vibration information or the sound information such that the number of times of sampling per rotation of the rolling bearing is a predetermined value; and a generation portion configured to generate, based on the timing derived by the derivation portion, monitoring data by sampling data from the vibration information or the sound information.

2. The state monitoring apparatus according to claim 1, wherein the generation portion is configured to generate the monitoring data by performing an order ratio analysis on the data sampled from the vibration information or the sound information.

3. The state monitoring apparatus according to claim 2, wherein the generation portion is further configured to perform envelope analysis processing or filter processing on the monitoring data.

4. The state monitoring apparatus according to claim 2, further comprising:

a diagnosis portion configured to diagnose a state of the rolling bearing using the monitoring data generated by the generation portion.

5. A wind power generation apparatus comprising:

the state monitoring apparatus according to claim 1; and a rolling bearing.

6. A state monitoring apparatus for a mechanical apparatus including a rolling bearing, the state monitoring apparatus comprising:

an acquisition portion configured to acquire vibration information or sound information of the rolling bearing during rotation at constant time intervals via a vibration sensor configured to detect a vibration or a sound of the rolling bearing and an amplifier configured to amplify an electric signal from the vibration sensor as the vibration information or the sound information;

a second acquisition portion configured to acquire a rotation speed of the rolling bearing during rotation via a rotation speed sensor;

a conversion portion configured to convert, based on the rotation speed sensed via the rotation speed sensor, the vibration information or the sound information acquired by the acquisition portion into a waveform at a state in which a rotation operation is at a constant angular velocity; and a diagnosis portion configured to diagnose a state of the mechanical apparatus using the vibration information or the sound information converted by the conversion portion, wherein the conversion portion is configured to perform conversion using a formula 1, wherein the formula 1 includes:

$$\omega_0 \times (t_a - t_0) = \int_{t_0}^{b} \omega_{(t)} dt$$

$$D(t_a) = A(t_b),$$

wherein:

$\omega_0$ is initial angular velocity, $\omega_{(t)}$ is angular velocity at time t, $t_0$ is a first time in the vibration data to be processed, $t_a$ and $t_b$ are times in which $t_0<t_b<t_a$, A(t) is vibration data before conversion at time t, and D(t) is vibration data after conversion at time t.

7. The state monitoring apparatus according to claim 6, wherein the conversion portion is configured to convert, as the constant angular velocity, an angular velocity at a predetermined timing when the acquisition portion acquires the vibration information or the sound information.

8. The state monitoring apparatus according to claim 6, further comprising:

a derivation portion configured to derive, based on rotation number during rotation of the rolling bearing, an angular velocity during the rotation, wherein the conversion portion is configured to convert, based on the angular velocity derived by the derivation portion, the vibration information or the sound information acquired by the acquisition portion.

9. The state monitoring apparatus according to claim 6, wherein the conversion portion is configured to perform conversion using the information acquired by the acquisition portion or information obtained by applying envelope processing to the information acquired by the acquisition portion.

10. A state monitoring method for a mechanical apparatus including a rolling bearing, the state monitoring method comprising:

an amplifying step of amplifying, via an amplifier, an electric signal from a vibration sensor configured to detect vibration information or sound information of the rolling bearing during rotation;

a first acquisition step of acquiring the vibration information or the sound information;

a second acquisition step of acquiring, from a rotation speed sensor, a rotation speed of the rolling bearing during rotation;

a derivation step of deriving, according to the rotation speed, a timing at which data is sampled from the vibration information or the sound information such that the number of times of sampling per rotation of the rolling bearing is a predetermined value; and a generation step of generating, based on the timing derived in the derivation step, monitoring data by sampling data from the vibration information or the sound information.

11. A state monitoring method for a mechanical apparatus including a rolling bearing, the state monitoring method comprising:

an amplifying step of amplifying, via an amplifier, an electric signal from a vibration sensor configured to detect vibration information or sound information of the rolling bearing during rotation;

an acquisition step of acquiring the vibration information or the sound information of the at constant time intervals;

a second acquisition step of acquiring, from a rotation speed sensor, a rotation speed of the rolling bearing during rotation;

a conversion step of converting, based on the rotation speed sensed via the rotation speed sensor, the vibration information or the sound information acquired in the acquisition step into a waveform at a state in which a rotation operation is at a constant angular velocity; and a diagnosis step of diagnosing a state of the mechanical apparatus using the vibration information or the sound information converted in the conversion step, wherein the conversion step performs the conversion using a formula 1, wherein the formula 1 includes:

$$\omega_0 \times (t_a - t_0) = \int_{t_0}^{t_b} \omega_{(t)} dt$$

$$D(t_a) = A(t_b),$$

wherein:

$\omega_0$ is initial angular velocity, $\omega_{(t)}$ is angular velocity at time t, $t_0$ is a first time in the vibration data to be processed, $t_a$ and $t_b$ are times in which $t_0<t_b<t_a$, A(t) is vibration data before conversion at time t, and D(t) is vibration data after conversion at time t.

12. A non-transitory computer-readable storage medium storing a computer program configured to cause a computer to execute:

an amplifying step of amplifying, via an amplifier, an electric signal from a vibration sensor configured to detect vibration information or sound information of a rolling bearing during rotation;

a first acquisition step of acquiring the vibration information or the sound information;

a second acquisition step of acquiring, from a rotation speed sensor, a rotation speed of the rolling bearing during rotation;

a derivation step of deriving, according to the rotation speed, a timing at which data is sampled from the vibration information or the sound information such that the number of times of sampling per rotation of the rolling bearing is a predetermined value; and a generation step of generating, based on the timing derived in the derivation step, monitoring data by sampling data from the vibration information or the sound information.

13. A non-transitory computer-readable storage medium storing a computer program configured to cause a computer to execute:

an amplifying step of amplifying, via an amplifier, an electric signal from a vibration sensor configured to detect vibration information or sound information of a rolling bearing during rotation;

an acquisition step of acquiring the vibration information or the sound information at constant time intervals;

a second acquisition step of acquiring, from a rotation speed sensor, a rotation speed of the rolling bearing during rotation;

a conversion step of converting, based on the rotation speed sensed via the rotation speed sensor, the vibration information or the sound information acquired in the acquisition step into a waveform at a state in which a rotation operation is at a constant angular velocity; and a diagnosis step of diagnosing a state of a mechanical apparatus including the rolling bearing using the vibration information or the sound information converted in the conversion step, wherein the conversion step performs the conversion using a formula 1, wherein the formula 1 includes:

$$\omega_0 \times (t_a - t_0) = \int_{t_0}^{t_b} \omega_{(t)} dt$$

$$D(t_a) = A(t_b),$$

wherein:

$\omega_0$ is initial angular velocity, $\omega_{(t)}$ is angular velocity at time t, $t_0$ is a first time in the vibration data to be processed, $t_a$ and $t_b$ are times in which $t_0 < t_b < t_a$, A(t) is vibration data before conversion at time t, and D(t) is vibration data after conversion at time t.

* * * * *